(12) United States Patent
Markefka (10) Patent No.: US 11,502,460 B2
(45) Date of Patent: Nov. 15, 2022

(54) DATA CABLE PLUG CONNECTOR FOR DATA TRANSMISSION

(71) Applicant: Erich Jaeger GmbH + Co. KG, Friedberg (DE)

(72) Inventor: Klaus Markefka, Florstadt (DE)

(73) Assignee: ERICH JAEGER GMBH + CO. KG, Friedberg (DE)

( * ) Notice: Subject to any disclaimer, the term of this patent is extended or adjusted under 35 U.S.C. 154(b) by 0 days.

(21) Appl. No.: 17/170,923

(22) Filed: Feb. 9, 2021

(65) Prior Publication Data

US 2021/0249820 A1 Aug. 12, 2021

(30) Foreign Application Priority Data

Feb. 11, 2020 (EP) ..................................... 20156736

(51) Int. Cl.
*H01R 13/6474* (2011.01)
*B60R 16/023* (2006.01)
(Continued)

(52) U.S. Cl.
CPC ....... *H01R 13/6474* (2013.01); *B60R 16/023* (2013.01); *H01R 13/50* (2013.01); *H01R 13/5812* (2013.01); *H01R 13/6477* (2013.01); *H01R 13/6581* (2013.01); *H01R 13/6592* (2013.01); *H01R 2201/04* (2013.01); *H01R 2201/26* (2013.01)

(58) Field of Classification Search
CPC ............ H01R 13/6474; H01R 13/6477; H01R 13/6581; H01R 13/6592; H01R 13/50; H01R 13/5812; H01R 2201/04; H01R 2201/26

USPC .......................................................... 439/471
See application file for complete search history.

(56) References Cited

U.S. PATENT DOCUMENTS 6,955,561 B2 * 10/2005 Seymour .................. H01R 9/05
439/585
10,033,140 B2 * 7/2018 Kanda ................ H01R 13/6473
(Continued)

FOREIGN PATENT DOCUMENTS

DE 102018104253 B4 * 12/2019 ........... H01B 11/002
DE 102018104253 B4 12/2019
(Continued)

*Primary Examiner* — Peter G Leigh
(74) *Attorney, Agent, or Firm* — Leydig, Voit & Mayer, Ltd.

(57) ABSTRACT

A data cable plug connector for data transmission includes a plug body comprising a cable connection end, a plug connection end and a plug shield. The cable connection end has a first connection channel for a first insulated conductor, a second connection channel for a second insulated conductor, and a shield connection for a conductor shield. The plug connection end has a contact carrier with contact openings for receiving contacts which are connectable to the insulated conductors. The cable connection end has an impedance transmitter made of electrically conductive material disposed adjacent to the contact carrier, the connection channels being formed in the impedance transmitter, and at least one material that is electrically conductive at least in parts being formed between the connection channels channel. Openings of the connection channels facing the contact carrier open into the openings of the contact carrier.

13 Claims, 3 Drawing Sheets

(51) Int. Cl.
*H01R 13/50* (2006.01)
*H01R 13/58* (2006.01)
*H01R 13/6477* (2011.01)
*H01R 13/6581* (2011.01)
*H01R 13/6592* (2011.01)

(56) References Cited

U.S. PATENT DOCUMENTS

| | | | |
|---|---|---|---|
| 10,103,500 B2 * | 10/2018 | Zebhauser | H01R 13/5825 |
| 10,348,044 B2 * | 7/2019 | Surer | H01R 4/64 |
| 2019/0267727 A1 * | 8/2019 | Zebhauser | H01R 13/6474 |
| 2019/0393651 A1 * | 12/2019 | Lödding | H01R 13/6471 |

FOREIGN PATENT DOCUMENTS

| | | |
|---|---|---|
| DE | 102018208532 A1 | 12/2019 |
| EP | 3319182 A1 | 5/2018 |

* cited by examiner

DATA CABLE PLUG CONNECTOR FOR DATA TRANSMISSION

CROSS-REFERENCE TO PRIOR APPLICATION

Priority is claimed to European Patent Application No. EP 20 156 736.9, filed on Feb. 11, 2020, the entire disclosure of which is hereby incorporated by reference herein.

FIELD

The present invention relates to a data cable plug connector for data transmission. Such a data transmission can be employed, for example, between a towing vehicle and a trailer or between a vehicle and a vehicle engine, for example an agricultural vehicle and an agricultural machine which can be attached to the agricultural vehicle. The data cable plug connector has at least one plug body which has a cable connection end, a plug connection end and a plug shield, in particular a plug shield surrounding the cable connection end and the plug connection end. The cable connection end is configured to provide a shielded data cable having at least a first insulated conductor and a second insulated conductor for data transmission and a conductor shield surrounding at least the first and second insulated conductors. It has a first connection channel for the first insulated conductor, a second connection channel for the second insulated conductor and a shield connection for the conductor shield. Shielding for data cables and their plug connectors is essential for data transmission at a high data rate in order to prevent interference.

Furthermore, the plug connection end of the data cable plug connector has a contact carrier with contact openings for receiving first and second contacts that can be connected to the first and second insulated conductors. The contact openings are arranged as through-openings (preferably running straight or rectilinearly) in the contact carrier running parallel at a contact spacing in an axial direction of the data cable plug connector, so that a plug with first and second plug contacts arranged at the contact spacing can be connected to the first and second contacts of the contact carrier for data transmission, in particular by plugging the plug into the plug connector terminal end of the data cable plug connector.

BACKGROUND

Conductor pairs in cables, in particular in data cables, usually have a close spacing. These are frequently also twisted. The thickness of the individual insulated conductors, and thus also of the entire cable, in particular also influences the maximum length of the cable over which a reliable data transmission is possible. For plug connectors which are sometimes plugged in several thousand times, it is occasionally necessary to optimize the haptics and/or the durability. This is often accompanied by thickening the plug contacts in order to satisfy the requirements of the users. Thicker plug contacts are also necessary if they are to connect together conductors of different diameters, for example in order to increase the total length of the cable during data transmission.

For this purpose, the spacing of the insulated conductors in the cable must be increased in the plug body. However, it is known that in particular geometric changes to plug connectors or changes in the spacing of conductors lead to imperfections in the data transmission.

It is precisely in the case of high-frequency data transmission that such imperfections minimize in particular possible data rates during data transmission. The imperfections in a plug connector arrangement emerge in particular in the form of impedance changes in the cable, which has an influence on the signal waves transmitted in the cable. From the prior art, inter alia from document DE 10 2018, 208, 532 A1, it is known that the impedance of a plug connector arrangement between plug and mating connector is to be kept constant or virtually constant along the plug-in direction. For this purpose, the prior art proposes an impedance compensation device which has an inductance section and a capacitance section, the inductance section generating a variable inductance contribution to impedance and the capacitance section generating a variable capacitance contribution to impedance, wherein the inductance contribution must be equal to the capacitance contribution in order to keep the impedance constant. For this purpose, an inductance section is disclosed which comprises a plurality of deflectable parts, wherein the inductance contribution can be increased and a capacitance contribution can be compensated by the deflection of the inductance section.

An alternative possibility of influencing the impedance of a plug connector arrangement is disclosed in document DE 10 2018 104 253 B4, the impedance being influenced in particular by the spacing between an outer conductor and conductors of a conductor pair or the spacing between the conductors of the conductor pair being changed.

However, these solutions prove disadvantageous in practice because these solutions are not reliable in a harsher environment. In this way, the conductors can move toward each other unintendedly due to outside effects, such as, for example vibrations. The impedance changes caused thereby adversely affect the data transmission. In addition, the solutions are structurally rather complex, which not only increases production costs, but also generates relative large tolerances in the cable guide, which lead to undesired impedance fluctuations.

SUMMARY

In an embodiment, the present invention provides a data cable plug connector for data transmission. The data cable plug connector includes a plug body comprising a cable connection end, a plug connection end and a plug shield. The cable connection end for connecting a shielded data cable, which is designed with at least a first insulated conductor and a second insulated conductor for data transmission and a conductor shield surrounding the first and second insulated conductors, has a first connection channel for the first insulated conductor, a second connection channel for the second insulated conductor, and a shield connection for the conductor shield. The plug connection end has a contact carrier with contact openings for receiving first and second contacts which are connectable to the first and second insulated conductors, the contact openings being arranged as through-openings in the contact carrier in an axial direction of the data cable plug connector running parallel at a contact spacing. The cable connection end has an impedance transmitter made of electrically conductive material disposed adjacent to the contact carrier, the first connection channel and the second connection channel being formed in the impedance transmitter, and at least one material that is electrically conductive at least in parts being formed between the first connection channel and the second connection channel. Openings of the first and second connection channels facing the contact carrier open into the through-openings of the contact carrier.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a data cable plug connector for data transmission which can be produced more simply and which reliably prevents fluctuations in impedance even in a technically harsh environment, such as plug connections in motor vehicles.

According to an embodiment of a data cable plug connector according to the present invention, provision is made in particular for an impedance transmitter made of electrically conductive material to be arranged in the cable connection end of the data cable plug connector, in which the first connection channel and the second connection channel and on which in some cases also the shield connection are formed, electrically conductive material being formed between the first connection channel and the second connection channel at least in parts. According to an embodiment of the present invention, the impedance transmitter is formed adjacent to the contact carrier, wherein openings of the first and the second connection channel facing the contact carrier open into the through-openings of the contact carrier.

It has been found that such a design and arrangement of an impedance transmitter in the data cable plug connector advantageously provides that line-wave resistance (also referred to as impedance or cable impedance) is only minimally influenced by the plug. This is of great importance in data cable plug connections for data cables, in particular in the transmission of high data rates, such as in the range of 1 Gbit/s (gigabits per second) for which the data cable plug connector according to an embodiment of the present invention can particularly preferably be used. Changes in line-wave resistance occur during the transition from a first data cable to the data cable plug connector, within the data cable plug connector, and during the transition from the data cable plug connector to a second data cable. Imperfections in data transmission, or changes in line wave resistance, result in the data signal (electromagnetic wave propagating in the data cable) being partially transmitted at the point of interference (i.e. propagating further in the data cable in the previous propagation direction) and also being partially reflected (i.e. propagating in the data cable counter to the previous propagation direction). This leads to interferences in signal transmission and should be prevented. The smallest possible change in the wave impedance in the data plug connection consequently indicates a small number of imperfections. Moreover, the proposed solution is very robust and can thus be reliably used even in the vehicle sector in which mechanical loads due to vibrations occur during the operation of the vehicles.

As a rule, it is also the case that the spacing of the insulated conductors in the data cable and the spacing of the contacts in the contact carrier are not the same, for example, for reasons of haptics, due to different diameters of the insulated conductors in the cables in the different ends of the data cable plug connector, or due to mechanical specifications for achieving a high number of reliably feasible plug-in events (mechanical stability of the contacts). The different spacing of the first and second insulated conductors results in a significant change in wave impedance. It has been found that the change in wave impedance during a change in spacing can be minimized by arranging electrically conductive material between the first and the second connection channels for guiding the first and second insulated conductors, so that in this region each of the conductors has its own conductor shield.

Accordingly, a particularly preferred embodiment of the present invention provides that the spacing between the first connection channel and the second connection channel changes, in particular becomes greater, in relation to the axial direction of the data cable plug connector (which can also correspond in particular to the center axis of the data cable plug connector). This is also the case, in particular, when the data cable plug connector has more than two insulated conductors or connection channels. According to an embodiment of the present invention, this can apply to a plurality of or all of the connection channels.

A change in the spacing of the connection channels can mean that the spacing of, for example, the center lines or of other, in each case identical, characteristic features of the connection channels changes in the plane which runs through the axial direction of the plug connector and through the center lines (for example other characteristic features) of the two connection channels. In a more general definition, a change in the spacing of the connection channels can be described by the fact that the spacing of the connection channels changes between a defined axis of the data cable plug connector in the axial direction, in the case of a round or oval data cable plug connector, in particular a center axis of the data cable plug connector, and the connection channel. Since the connection channels form a separate conductor shield of the first and second insulated conductors, electromagnetic compatibility, among other things, is improved and the susceptibility of signal transmission to interference is minimized.

According to a preferred embodiment, it can be provided that the length of the connection channels in the data cable plug connector be the same. This prevents propagation time differences of the signals in the first, the second and possibly any further connection channels. Such a propagation time difference can lead to faults in data transmission and changes in line-wave resistance (impedance). In order to additionally facilitate the data transmission behavior of a data cable plug connector, it can be provided that a cable lead-in into the data cable plug connector, a plug contact connection pattern for plugging in a plug, and the connection channels be each arranged symmetrically with respect to a selected axial axis of the data cable plug connector, for example its center axis. Since all module components arranged about the conductor guides also influence transmission behavior, in particular due to their shielding effect, it can be particularly advantageous if the data cable plug connector and the module components defining it are arranged and designed symmetrically or at least largely symmetrically with respect to a selected axis of symmetry (such as the axial axis of the data cable plug connector, for example the center axis).

A further preferred embodiment of the data cable plug connector can be characterized in that the first and the second connection channels (and possibly further connection channels) are designed as non-parallel passages in the impedance transmitter. The number of connection channels or passages preferably corresponds precisely to the number of insulated conductors used for the data transmission. The passages can be designed in particular in the form of (straight-line) through-holes, wherein the surface quality of the through-holes can also determine impedance behavior in the region of the through-holes.

The passages of the various connection channels preferably run symmetrically at an angle to a longitudinal axis (axial axis) of the plug body. The angle here is preferably identical, measured from the center axis of the data cable plug connector. Preferably, the angle of the passages with respect to the center axis and the length of the passages are determined such that the closest spacing of the at least two insulated conductors is minimal before entry into the passages and is at a maximum after exiting the passages.

A preferred embodiment provides that an inner diameter of the passages is designed larger than an outer diameter of the insulated conductors of the data cable, so that between an insulated conductor of the data cable guided in the passage and the impedance transmitter, an intermediate space is formed that is filled with an electrically non-conductive material, which correspondingly has a different dielectric constant $\varepsilon_R$ to the impedance transmitter.

The material in the intermediate space between the insulated conductor guided in the passage and the inner wall of the passage can in particular be air or another material which has a lower dielectric constant $\varepsilon_R$ than the electrically conductive material of the impedance transmitter, i.e. it acts as a dielectric. The electrically conductive material of the impedance transmitter can be, for example, a nickel-plated copper or brass alloy or comprise one of these materials.

The impedance of the data cable plug connector can be changed by the size of the intermediate space, the dielectric constant $\varepsilon_R$ of the material filling the intermediate space and/or the spacing of the connection channels. Since not only the length of the passages, but also the spacing of the inner wall of the passages from the insulated first and second conductors influences transmission behavior, the passages advantageously have a constant diameter over their length.

The plug-connection-end openings of the impedance transmitter or of the connection channels open into the through-opening of the contact carrier. In this case, the contact carrier can partially enclose the impedance transmitter, for example by projecting edge regions.

According to a further preferred embodiment of the present invention, the contact carrier can be constructed from a plastic material having a defined dielectric constant $\varepsilon_R$. In practice, the plastic material may have a dielectric constant $\varepsilon_R$ of approximately 3 and, in addition, may in particular lie in a range between approximately 2 or 2.5 and approximately 4. With the geometries and data cables given in practice and with the advantageous embodiments and materials described above, it is frequently possible to set an impedance in the region of the contact carrier which corresponds to the impedance of the data cable, for example 100 ohms. Although the values for the dielectric constant $\varepsilon_R$ of the plastic carrier represent typical value ranges, embodiments of the present invention are not limited thereto.

Comparable with the intermediate space between the insulated conductors and the inner wall of the passages of the impedance transmitter, the conductors and contacts can in principle also be spaced apart from the inner wall of the through-openings of the plastic carrier. Even at this location, it may be advantageous to fill this intermediate space with a material, for example air.

Furthermore, in a preferred embodiment, the first and/or second contact in the contact carrier in the axial direction of the data cable plug connector at a first position may have an offset in the outer diameter if corresponding contacts of the data cable plug connector are fixed to the data cables, for example by crimping or soldering. In that case, in the axial direction of the data cable plug connector, the contact carrier can have an offset in the outer diameter at a second position in order to accommodate these contacts in the contact carrier. Since the data transmission behavior, as already described above, is influenced inter alia by the impedance in the data cable plug connector (the shielding being determined inter alia by the totality of the materials located between the environment surrounding the outside of the data cable plug connector and the conductor and/or contact), it is advantageous if the spacing between the environment surrounding the data cable plug connector and the conductor and/or contact varies depending on one another. It is therefore advantageous if the second position has an offset in the axial direction at the same position as the first position. Such an offset may also fix and/or secure a conductor and/or contact.

In a preferred embodiment which allows the transmission of particularly high data rates, the present invention provides that the impedance in the data cable plug connector corresponds to the impedance value of the data cable. According to a particularly preferred embodiment, it is provided that the impedance in the data cable plug connectors be set by varying at least one of the parameters:
 course of the passages,
 size of the intermediate space,
 dielectric constant $\varepsilon_R$ of the material filling the intermediate space,
 dielectric constant $\varepsilon_R$ of the contact carrier,
 first position of the offset in the outer diameter of the contact, and
 second position of the offset in the outer diameter of the contact carrier,
in such a way that the impedance in the data cable plug connector corresponds to a predetermined impedance value of the data cable.

The variation of the course of the passages in the impedance transmitter includes in particular a variation of the angle between center axes of the connection channels and/or a variation of the length of the impedance transmitter in the axial direction of the data cable plug connector. In addition, the variation of the course of the passages also includes all of the variation possibilities already mentioned above which bring about an influencing of the impedance, such as, for example, the change in surface quality.

An optimum of the parameters can be determined according to a possible embodiment by calculating the impedance in a physical model of the data cable plug connector. Since the parameters partially influence one another, a plurality of optimal parameter values may exist, wherein the impedance in the data cable plug connector corresponds to a predetermined impedance value of the data cable. However, determination of the parameters in a physical model is relatively complex, because the theoretical calculation of the impedance necessitates a precise consideration of the materials used and of geometric relationships.

An alternative possibility for optimizing the parameters is therefore to carry out a measurement of the impedance in the impedance transmitter, in particular by means of a time-domain reflectometry measuring device. In time-domain reflectometry (TDR), run lengths and reflection characteristics of electromagnetic waves and signals in cables or signal conductors are determined. Such a method or similar methods are known to a person skilled in the art. They are based on a pulse generator generating a sequence of very short signals which are fed into the cable. In a measuring device, the signal amplitudes and the propagation time of the signals are compared to the signal that is fed in. Interference sources can be located by the comparison. Consequently, the interference sources are detected in particular by the impedance deviating, in particular deflecting, at the interference source.

Accordingly, in order to adapt the impedance of the data cable plug connector to the impedance value of the data cable, the data cable can be connected to the data cable plug connector and interference sources can be determined in a spatially resolved manner. By varying the parameters, the interference sources can then be eliminated or at least reduced to such an extent that the interferences do not stand in the way of reliable data transmission.

It has been found that the proposed data cable plug connector has an already similar impedance value in the basic configuration in the case of conventional data cables, which frequently have an impedance of about 100 ohms. A similar impedance value here means that the impedance deviates by no more than 5% from an average impedance over the length of the data cable plug connector, and the impedances over the length of the data cable plug connector thus lie preferably in the range of 100±5Ω. The same consequently also applies to the impedance in the region of the impedance transmitter.

Accordingly, it has proven to be a preferred embodiment to use empirically determined parameters in which, in measurements by means of time-domain reflectometry measuring devices do not display impedance changes or interferences in the data cable plug connector. For the measurements, the data cable plug connector can be connected to a data cable. Interferences are understood in particular to mean impedance changes of a magnitude which interfere with a data transmission at the desired data rate.

The particular order of magnitude can in some cases be determined empirically by a person skilled in the art. Optimization can therefore be effected in particular by the measured impedance over the length of the data cable plug connector being virtually identical to the impedance of the cable outside the plug connector, or in other words no faults are detected within the data cable plug connector that adversely affect data transmission.

Furthermore, a particularly preferred embodiment of the data cable plug connector has a shield connection, wherein the shield connection for the conductor shield is preferably formed on the impedance transmitter and the impedance transmitter is electrically conductively connected to the plug shield. This has, above all, structural advantages, since the impedance transmitter is preferably designed to be flat at least in some regions in the cable connection end, so that an electrically conductive connection between the conductor shield and the impedance transmitter can be produced relatively simply without further design effort. According to an embodiment of the present invention, the shield connection particularly preferably surrounds the first and second connection channels completely, i.e. forms a circular ring on the impedance transmitter running 360° around the (or all) connection channels. Since the electrically insulated conductors, after emerging from the data cable, directly enter the impedance transmitter or the passages thereof, a break in the shielding can also be prevented by connecting the conductor shield to the impedance transmitter.

In a particularly preferred embodiment, the plug body has a cable lead-in with a strain relief clip and a clamping nut at the cable connection end, wherein the strain relief clip can be pressed against the impedance transmitter by screwing down the clamping nut, and the cable lead-in is arranged opposite the connection channels in the impedance transmitter. In particular, this makes it possible to fix or press the conductor shield against the impedance transmitter, the conductor shield being fixed or pressed on in particular between a surface of the strain relief clip facing the plug connection end and a surface of the impedance transmitter facing the cable connection end. Screwing on the clamping nut also enables a modular and robust design of the data cable plug connector. In addition, the described embodiment permits a straight-line insertion of the insulated conductors of the data cable into the openings of the connection channels formed as passages in the impedance transmitter. Impedance changes and thus points of interference in the data cable plug connector are thereby avoided or reduced.

In a particularly preferred embodiment of the present invention, the connection channels can open into a common recess of the impedance transmitter. Such a recess provides enough space for a kink-free guidance of the insulated conductors from the data cable into the connection channels. The shield connection is preferably formed around this recess. In combination with the features described above, this makes it possible for the power shield of the data cable to be pressed between the strain relief clip and the impedance transmitter and to be held electrically conductively both against the impedance transmitter and against the strain relief clip that is preferably also metallic. This facilitates a complete and reliable shielding of the conductors of the data cables in the cable lead-in while at the same time having sufficient flexibility to prevent kinking in the electrical conductor and/or damage to the electrical conductor. This also prevents impedance changes and thus interferences in the entry of the data cable into the data cable plug connector.

In a particularly preferred embodiment of the present invention, the data cable of a motor vehicle is connected to the cable connection side of the data cable plug connector, the data cable being connected or connectable to the vehicle data network of the motor vehicle. Furthermore, a data cable plug connector according to an embodiment of the present invention can be used for connecting towing vehicle and trailer or motor vehicle to an external wired data communication. Such an external wired data communication comprises in particular the connection to devices or functions that can be provided externally to the motor vehicles.

Since the data cable plug connectors are in this case also exposed in particular to environmental influences, for example humidity, it can be advantageous to seal the data cable plug connector, for example, at the transition from the data cable to the plug body.

Furthermore, the data cable plug connector according to an embodiment of the present invention can be used for connecting two data cables to insulated conductors of different diameters. Such a use is particularly advantageous in the automotive sector, since the cables in a data network of a motor vehicle frequently have conductors with a small cross-section of about 0.13 to 0.15 mm$^2$. These are used within the vehicle for fast data transmission, for example up to one Gbit/s. These small cross-sections can ensure the desired impedance of the data cables, for example about 100 ohms, but only over relatively short cable lengths of up to about 8 to 10 meters. Connections to trailers or external devices therefore cannot be achieved. In order to achieve a Gbit data transmission over cable lengths of up to 40 meters, a transition to data cables having larger cross-sections, in particular in the range from 0.35 to 0.75 mm$^2$, must be achieved. The plugs of such data cables require a larger contact spacing, so that corresponding data cable plug connectors also have to be made available. Such data cable plug connectors may preferably have a pin contact spacing in the range of 5±1 mm. For this purpose, the data cable plug connector proposed according to an embodiment of the present invention is particularly well-suited because the proposed impedance transmitter proposes a connection channel which makes it possible to change the spacing of the data lines without changing the impedance.

Further features, advantages and application possibilities of embodiments of the present invention are revealed by the following description of exemplary embodiments and the drawings. All of the features described and/or illustrated by themselves or in any combination here form the subject-matter of embodiments of the present invention, regardless of how they are summarized in described or illustrated exemplary embodiments or in the claims.

Figure 1:
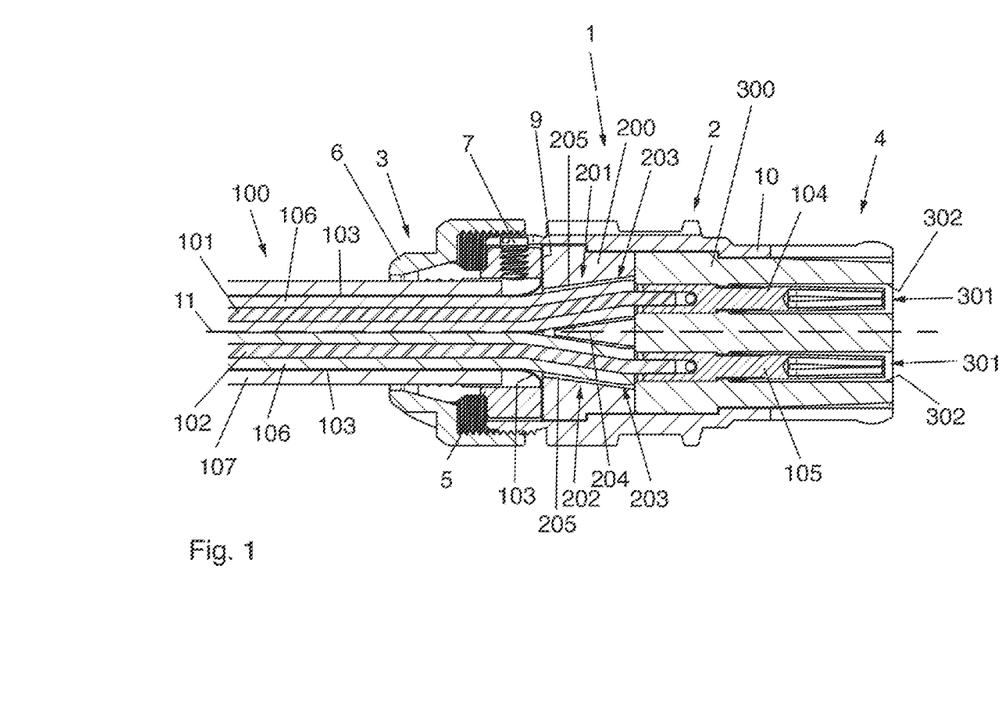
FIG. 1 a cross-sectional view of an inventive data cable plug connector according to an embodiment of the present invention.

The data cable plug connector 1 shown in FIG. 1 for data transmission, in particular a high-frequency data transmission in the automotive and commercial vehicle sector, has a plug body 2 with a cable connection end 3 and a plug connection end 4. At the cable connection end 3, a data cable 100 leads into the data cable plug connector 1. The data cable 100 in FIG. 1 comprises a first conductor 101 and a second conductor 102, each surrounded by a conductor insulation 106. The insulated first and second conductors 101 and 102 are situated in turn within a conductor shield 103 surrounded by a cable sheath 107.

At the cable connection end 3, the data cable 100 first enters the data cable plug connector 1 through a clamping nut 6, for example. In FIG. 1 the clamping nut 6 is arranged screwed against a strain relief clip 5. Instead of the strain relief shown here, a person skilled in the art can also implement strain relief differently in accordance with the invention.

The data cable 100 is routed through strain relief clip 5, the strain relief clip 5 pressing the conductor shield 103 against an impedance transmitter 200 in the plug connection direction. The conductor shield 103 is thus directly connected to the electrically conductive impedance transmitter 200. The strain relief clip 5 can also have an electrically conductive material, so that a shield connection 9 is formed by a surface of the impedance transmitter 200 and in some cases also by the strain relief clip 5.

A preferred embodiment of the data cable plug connector 1 can comprise a seal or a plurality of seals (not shown here) between the plug body 2 and the data cable 100 and/or between the clamping nut 6 and the data cable 100, in particular if it is possible for the data cable plug connector 1 to be exposed to moisture and/or dirt, for example in the region outside a motor vehicle.

The strain relief clip 5 can furthermore have a first anti-rotation device 7 which in FIG. 1 includes a grub screw. In the assembled state of the data cable plug connector 1, the grub screw can engage in a protrusion of a threaded region of the plug body 2 formed on the cable connection side, so that a relative rotation of the data cable 100 to the data cable plug connector 1 is prevented.

The insulated first and second conductors 101 and 102 of the data cable 100 after exiting the cable sheath 107 are inserted into the impedance transmitter 200 proposed according to the invention. The impedance transmitter 200 bears on the strain relief clip 5 at the cable connection end, so that the conductor shield 103 is clamped in an electrically conductive manner between the strain relief clip 5 and the impedance transmitter 200. For the sake of clarity, it should be pointed out that according to the invention the data cable plug connector does not have to have a data cable 100; the data cable 100 is therefore not necessarily part of the invention. In this case, the data cable plug connector 1 is designed to receive a corresponding conventional data cable 100. However, in one embodiment, the data cable plug connector 1 can even already be equipped with the data cable 100 which has been removed and is shown for illustration.

At the plug connection end, the impedance transmitter 200 rests against a contact carrier 300. The impedance transmitter 200 has a shoulder between the contact surfaces of the cable connection end and the plug connection end. This shoulder bears against an offset of a plug shield 10 so that a movement of the impedance transmitter 200 in the direction of the plug connection end 4 is limited in particular by the offset of the plug shield 10.

As shown in FIG. 1, the first and second insulated conductors 101 and 102 are guided into a first connection channel 201 and a second connection channel 202. The connection channels 201 and 202 are formed in particular by passages 205 in the form of through-holes. The passages 205 are at an identical angle to a center axis 11 of the data cable plug connector 1 in the impedance transmitter 200. The intermediate region formed thereby, i.e. the region between the two passages 205, is filled according to the invention with an electrically conductive material 204, preferably the electrically conductive material 204 of the impedance transmitter 200.

In addition, an intermediate space 203 is formed between the conductor insulation 106 of the electrical conductors 101 and 102 and the inner wall of the passages 205. The intermediate space 203 may be filled with a dielectric (i.e., non-electrically conductive) material, in particular with air. This material preferably has a dielectric constant $\varepsilon_R$ which is different from the impedance transmitter 200 and thus acts as an additional dielectric.

At the plug connection end, the first and second conductors 101 and 102 lead into the contact carrier 300 or into first and second contacts 104 and 105 incorporated in the contact carrier 300. The conductor insulation 106 ends here at the end of the impedance transmitter 200, i.e. when it enters the contact carrier 300 or the contacts 104 and 105.

The contact carrier 300, which is preferably formed from a plastic material, has two through-openings 302. Arranged in each of these through-openings 302 is one of the contacts 104 and 105, i.e., a first contact 104 and a second contact 105. The first conductor 101 and the second conductor 102 are joined to such first and second contacts 104 and 105, for example, by crimping or soldering.

Between the plug-connection-end boundary of the contact carrier 300 and the cable-connection-end contact surface with the impedance transmitter 200, the contact carrier 300 has an offset in its outer circumference. This offset abuts onto an offset of the plug shield 10 so that a movement of the contact carrier 300 is limited in the direction of the plug connection end 4 in particular by the shoulder of the plug shield 10. In particular, an undesired emergence of the contact carrier from the plug body 2 at the plug connection end can be prevented by the shoulder. Moreover, the position of the offset of contact carrier 300 and plug shield 10 corresponds to an offset in the outer circumference of the contacts 104 and 105. This offset helps to keep the impedance of the data cable plug connector 1 constant along its center axis 11 and thus to prevent relevant imperfections in the data transmission.

At the plug connection end, the contact carrier 300 in each case has a contact opening 301 for in each case one through-opening 302 for inserting contacts of a plug (not shown), for example pin contacts of the plug, which are inserted into socket contacts of the contacts 104 and 105. However, the invention is not restricted to such a design of the contacts.

The data cable plug connector 1 is axially symmetrical, wherein the axis of symmetry is formed by the center axis 11.

Figure 2:
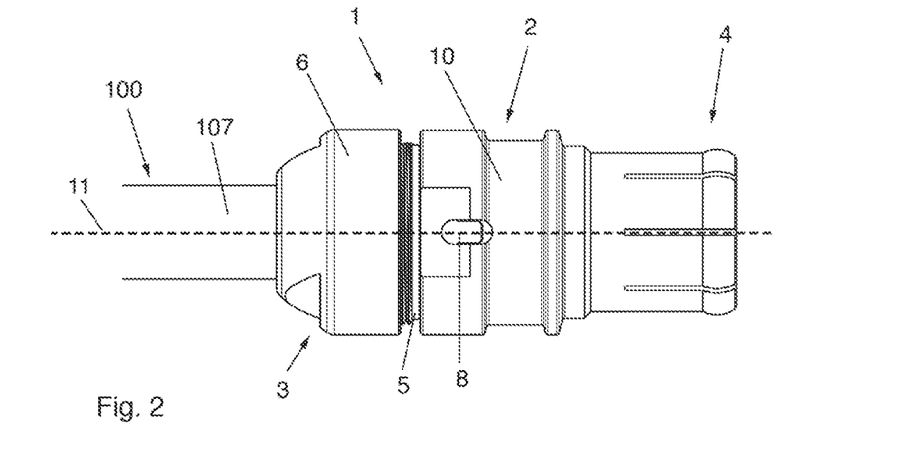
FIG. 2 the data cable plug connector according to FIG. 1 in an uncut side view.

The data cable plug connector 1 shown in FIG. 1 is shown uncut in FIG. 2. In addition to the plug body 2, the cable connection end 3, the plug connection end 4 and the data cable 100, a second anti-rotation device 8 is shown in particular. This anti-rotation device 8 has an extension, in particular a nipple, which is formed on the contact carrier 300 and a corresponding recess in the plug shield 10 of the plug body 2. This prevents the contact carrier 300 from twisting in the plug body 2.

Figure 3:
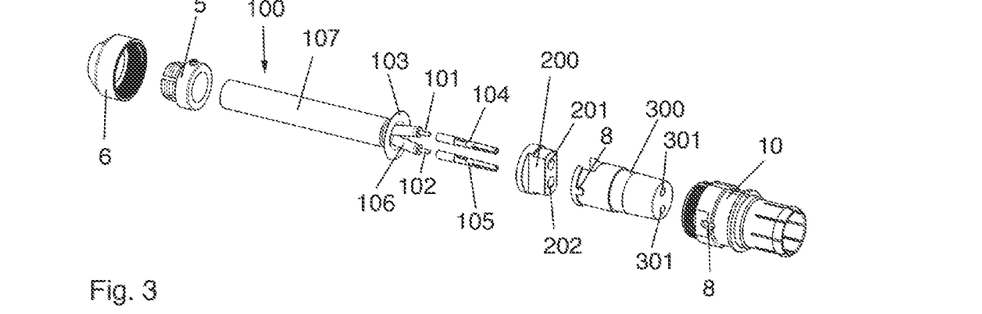
FIG. 3 an exploded perspective view of the data cable plug connector according to FIG. 1.

FIG. 3 shows an exploded view of an embodiment of the data cable plug connector 1 according to the invention. In addition to the features already described above, this illustration shows that the impedance transmitter 200 in the assembled state is located at least partially in the contact carrier 300, by virtue of the projecting edges of the contact carrier 300 receiving flattened regions of the impedance transmitter 200. Since the contact carrier 300 is mounted in a rotationally secure manner due to the second anti-rotation device 8, the impedance transmitter 200 is also mounted in a rotationally secure manner in the assembled state.

The conductor shield 103 of the data cable 100 is shown as flat (completely closed) in FIG. 3. However, because the conductor shield 103 is preferably made of a metal mesh, for example an aluminum mesh, or an aluminum foil, the representation of the conductor shield 103 at this point is merely illustrative and does not necessarily have to be flat. In particular, individual wires of the mesh can be formed there. The wire mesh preferably rests on the entire surface of the shield connection 9 in an electrically conductive manner, i.e. 360° around the center axis of the data cable plug connector 1. According to the invention, for preventing imperfections this is better than a connection via individual contact points.

Figure 4:
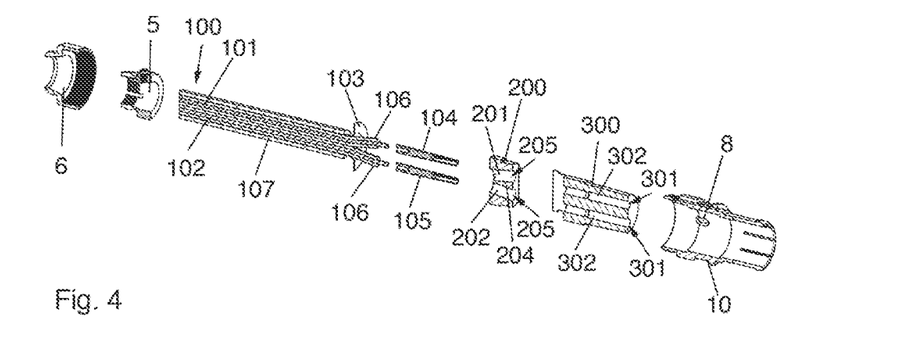
FIG. 4 a cross-sectional view of the data cable plug connector according to FIG. 3.

The first and second contacts 104 and 105, which in the assembled state are arranged in the through-openings 302 of the contact carrier, have a wing or a latching lug. When the contacts 104 and 105 are inserted into the contact carrier 300 from the cable connection end 3, the latching lugs are first compressed within the through-openings 302 by a shoulder recognizable in FIGS. 1 and 4. As soon as the contacts 104 and 105 are fully pressed into the through-openings 302, the latching lugs deploy and thus secure the contacts 104 and 105 in the contact carrier 300. When the conductors 101 and 102 are connected to the contacts 104 and 105, the conductors 101, 102 are inserted into the openings of the contacts 104 and 105 on the cable connection side and fixed there. Since the contacts 104 and 105 are held in the through-openings 302, the contacts cannot be pressed out of the contact carrier 300, for example when a plug is being plugged in. The offset in the through-openings 302 on which the latching lugs of the contacts 104 and 105 are supported can be recognized in particular in the sectional view of FIG. 4.

Figure 5A:
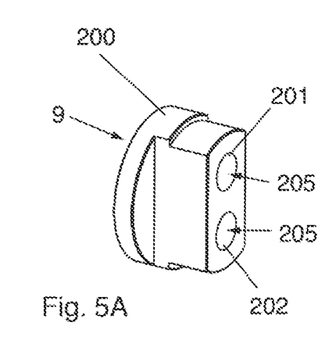
FIG. 5A a perspective three-dimensional view of an impedance transmitter according to an embodiment of the present invention of the data cable plug connector.
Figure 5B:
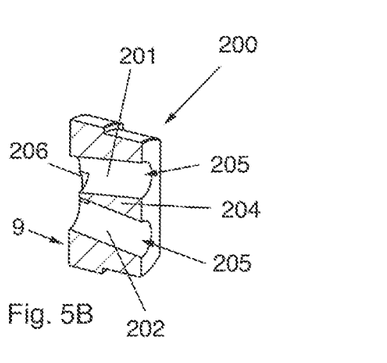
FIG. 5B the impedance transmitter according to FIG. 5A in a cross-sectional view.
Figure 5C:
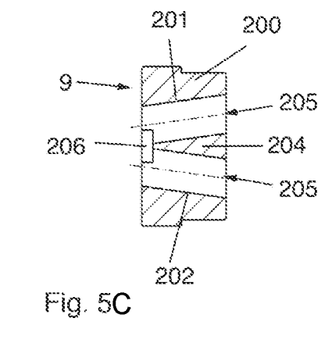
FIG. 5C a sectional side view of the impedance transmitter according to FIG. 5A.
Figure 5D:
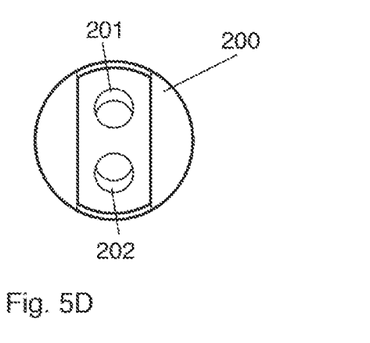
FIG. 5D a front view at the plug connection end of the impedance transmitter according to FIG. 5A.

FIGS. 5A to 5D show cut and uncut as well as differently oriented representations of a possible embodiment of impedance transmitter 200. In particular, FIGS. 5B and 5C show the passages 205 designed in the form of through-holes, which are arranged separated from one another by an electrically conductive material 204. The passages 205 serve to guide the insulated conductors 101 and 102. In particular, due to the electrically conductive material 204 arranged between the insulated conductors 101 and 102 when the conductors 101 and 102 in the assembled state are guided in the passages 205, each of the conductors 101, 102 has its own conductor shield at this location. This is an important feature to prevent impedance changes in the event of the spacing between the conductors 101 and 102 increasing.

In FIGS. 5A to 5D, the passages 205 of the impedance transmitter 200 are arranged not parallel to one another but at an angle. As a result, the connection channels 201 are spaced further from one another in the direction of the plug connection end 4 than in the direction of the cable connection end 3. FIG. 5C also shows that the feed-throughs 205 of the first connection channel 201 and the second connection channel 202 lead into a common recess 206 at the cable connection end, being formed by a face of the impedance transmitter 200 forming the shield connection 9.

In the assembled state, a very compact and extremely robust data cable plug connector is thus produced which has the advantages of being produced more simply and reliably preventing fluctuations in impedance even in a technically harsh environment, such as plug connections in motor vehicles.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Data cable plug connector
2 Plug body
3 Cable connection end
4 Plug connection end
5 Strain relief clip
6 Clamping nut
7 First anti-rotation device
8 Second anti-rotation device
9 Shield connection
10 Plug shield
11 Center axis
100 Data cable
101 First conductor
102 Second conductor
103 Conductor shield
104 First contact
105 Second contact
106 Conductor insulation
107 Cable sheath
200 Impedance transmitter
201 First connection channel
202 Second connection channel
203 Intermediate space
204 Electrically conductive material
205 Passage
206 Recess
300 Contact carrier
301 Contact opening
302 Through-opening

What is claimed is:

1. A data cable plug connector for data transmission, the data cable plug connector comprising:
    a plug body comprising a cable connection end, a plug connection end and a plug shield,
    wherein the cable connection end for connecting a shielded data cable, which is designed with at least a first insulated conductor and a second insulated conductor for data transmission and a conductor shield surrounding the first and second insulated conductors, has a first connection channel for the first insulated conductor, a second connection channel for the second insulated conductor, and a shield connection for the conductor shield;
    wherein the plug connection end has a contact carrier with contact openings for receiving first and second contacts which are connectable to the first and second insulated conductors, the contact openings being arranged as through-openings in the contact carrier in an axial direction of the data cable plug connector running parallel at a contact spacing;
    wherein the cable connection end has an impedance transmitter made of electrically conductive material disposed adjacent to the contact carrier, the first connection channel and the second connection channel being formed in the impedance transmitter, and at least one material that is electrically conductive at least in parts being formed between the first connection channel and the second connection channel;
    wherein openings of the first and second connection channels facing the contact carrier open into the through-openings of the contact carrier, and
    wherein the plug body has, at the cable connection end, a cable lead-in with a strain relief clip and a clamping nut, wherein the strain relief clip is pressable against the impedance transmitter by screwing down the clamping nut, and wherein the cable lead-in is arranged opposite the first and second connection channels in the impedance transmitter.

2. The data cable plug connector according to claim 1, wherein a spacing of the first connection channel and the second connection channel changes with respect to the axial direction of the data cable plug connector.

3. The data cable plug connector according to claim 1, wherein the first and second connection channels have a same length.

4. The data cable plug connector according to claim 1, wherein the first and the second connection channels are non-parallel passages in the impedance transmitter.

5. The data cable plug connector according to claim 4, wherein an inner diameter of the passages is designed to be larger than an outer diameter of the first and second insulated conductors of the shielded data cable such that an intermediate space filled with an electrically non-conductive material is formed in each case between a respective one of the first and second insulated conductors guided within a respective one of the passages and the impedance transmitter.

6. The data cable plug connector according to claim 1, wherein the contact carrier is constructed from a plastic material having a defined dielectric constant $\varepsilon_R$.

7. The data cable plug connector according to claim 1, wherein the contact carrier is designed to receive the first and/or second contact in the contact carrier which, in the axial direction of the data cable plug connector, have an offset in outer diameter at a first position, for which purpose the contact carrier has an offset in outer diameter in the axial direction of the data cable plug connector at a second position.

8. The data cable plug connector according to claim 4, wherein the impedance in the data cable plug connector is adjusted by varying at least one of the parameters:
    course of the passages;
    size of an intermediate space in the passages in each case between a respective one of the first and second insulated conductors and the impedance transmitter;
    dielectric constant $\varepsilon_R$ of a material filling the intermediate space;
    dielectric constant $\varepsilon_R$ of the contact carrier;
    first position of an offset in outer diameter of the first and/or second contact; and
    second position of an offset in outer diameter of the contact carrier,
    in such a way that the impedance in the data cable plug connector corresponds to a predetermined impedance value.

9. The data cable plug connector according to claim 8, wherein empirically determined parameters are used in which, in measurements by time-domain reflectometry measuring devices, no impedance changes or interferences in the data cable plug connector connected to the shielded data cable are indicated which interfere with a data transmission at a desired data rate.

10. The data cable plug connector according to claim 1, wherein the shield connection for the conductor shield is formed on the impedance transmitter and the impedance transmitter is electrically conductively connected to the plug shield.

11. The data cable plug connector according to claim 1, wherein the first and second connection channels open into a common recess of the impedance transmitter.

12. The data cable plug connector according to claim 1, wherein the shielded data cable is a shielded data cable of a motor vehicle and is connected to the cable connection end of the data cable plug connector, and wherein the shielded data cable is connected or connectable to a vehicle data network of the motor vehicle.

13. A method for electrical connection of two data cables, the method comprising:
   providing the two data cables which have insulated conductors of different diameters; and
   connecting the two data cables using the data plug cable connector according to claim 1.

* * * * *